(12) United States Patent
Smith

(10) Patent No.: US 11,479,417 B2
(45) Date of Patent: Oct. 25, 2022

(54) SENSOR SYSTEMS AND METHODS FOR DETECTING CONVEYOR TENSION IN A MINING SYSTEM

(71) Applicant: Joy Global Underground Mining LLC, Warrendale, PA (US)

(72) Inventor: Robert Smith, Malvern (GB)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 17/076,606

(22) Filed: Oct. 21, 2020

(65) Prior Publication Data

US 2021/0032045 A1 Feb. 4, 2021

Related U.S. Application Data

(63) Continuation of application No. 16/161,607, filed on Oct. 16, 2018, now Pat. No. 10,843,875.

(Continued)

(51) Int. Cl.
*G01L 5/04* (2006.01)
*B65G 43/02* (2006.01)
(Continued)

(52) U.S. Cl.
CPC ............ *B65G 43/02* (2013.01); *B65G 23/44* (2013.01); *G01C 3/06* (2013.01); *G01L 5/047* (2013.01); *G01L 5/10* (2013.01)

(58) Field of Classification Search
CPC .......... G01L 5/047; G01L 5/105; G01C 3/08; G01C 3/06; B65G 43/00; B65G 23/44
See application file for complete search history.

(56) References Cited

U.S. PATENT DOCUMENTS 3,963,115 A * 6/1976 Teske ................. B65G 43/02
198/718
4,284,192 A * 8/1981 Taylor ................. G05D 15/01
198/813

(Continued)

FOREIGN PATENT DOCUMENTS

CN 1257207 A 6/2000
CN 2835947 Y 11/2006
(Continued)

OTHER PUBLICATIONS

U.S. Appl. No. 17/076,618, filed Oct. 21, 2020 (37 pages including cover page).

(Continued)

*Primary Examiner* — Tran M. Tran
(74) *Attorney, Agent, or Firm* — Michael Best & Friedrich LLP

(57) ABSTRACT

A conveyor system that includes a sprocket, a conveyor element, a sensor, a tensioning system, and an electronic processor. The conveyor element is coupled to the sprocket to move around the sprocket. The sensor is positioned adjacent to the sprocket and configured to generate an output signal indicative of a detection of the conveyor element. The electronic processor is coupled to the sensor and to the tensioning system. The electronic processor is configured to receive the output signal from the sensor, estimate a trajectory of the conveyor element based on the output signal, determine a value for slack distance based on the estimated trajectory of the conveyor element, and control the tensioning system based on the value for slack distance.

20 Claims, 13 Drawing Sheets

Related U.S. Application Data

(60) Provisional application No. 62/573,552, filed on Oct. 17, 2017.

(51) Int. Cl.
*B65G 23/44* (2006.01)
*G01C 3/06* (2006.01)
*G01L 5/10* (2020.01)

(56) References Cited

U.S. PATENT DOCUMENTS

| | | | |
|---|---|---|---|
| 5,131,528 A | 7/1992 | Bandy, Jr. | |
| 5,402,879 A * | 4/1995 | Briehl | B65G 23/36 198/832 |
| 5,482,154 A | 1/1996 | Affeldt et al. | |
| 5,501,320 A | 3/1996 | Chipcase | |
| 5,624,162 A | 4/1997 | Guse et al. | |
| 5,632,372 A | 5/1997 | Steinbuchel, IV et al. | |
| 5,641,058 A * | 6/1997 | Merten | B65G 23/44 198/810.04 |
| 5,647,640 A * | 7/1997 | Heintzmann | E21C 27/34 299/1.6 |
| 5,895,332 A * | 4/1999 | Olson | F16H 7/1263 474/113 |
| 5,918,729 A | 7/1999 | Chang | |
| 5,997,423 A * | 12/1999 | Kwon | B65G 23/44 198/810.04 |
| 6,029,799 A * | 2/2000 | Weigel | B65G 23/36 198/810.04 |
| 6,047,814 A | 4/2000 | Alles et al. | |
| 6,523,424 B1 | 2/2003 | Hayes et al. | |
| 6,545,231 B1 | 4/2003 | Hafner | |
| 6,695,130 B1 | 2/2004 | Blaylock et al. | |
| 6,851,546 B2 * | 2/2005 | Lodge | G01B 7/046 198/502.1 |
| 6,988,610 B2 | 1/2006 | Fromme et al. | |
| 7,117,989 B2 | 10/2006 | Weigel et al. | |
| 7,322,462 B2 | 1/2008 | Landry | |
| 7,331,445 B2 | 2/2008 | Roland | |
| 7,427,767 B2 | 9/2008 | Kemp | |
| 7,513,356 B2 | 4/2009 | Veiet et al. | |
| 7,540,374 B2 * | 6/2009 | Rathbun | G01B 11/043 198/810.04 |
| 7,798,313 B2 | 9/2010 | Hesketh | |
| 7,894,934 B2 | 2/2011 | Wallace et al. | |
| 8,061,510 B2 | 11/2011 | Tout | |
| 8,127,918 B2 | 3/2012 | Warner | |
| 8,191,703 B2 * | 6/2012 | Tokhtuev | B65G 43/02 198/810.04 |
| 8,396,588 B2 | 3/2013 | Senger et al. | |
| 8,550,236 B2 * | 10/2013 | Merten | E21C 29/14 198/810.04 |
| 8,636,140 B2 | 1/2014 | Tout et al. | |
| 8,657,105 B2 | 2/2014 | Twigger et al. | |
| 8,931,628 B2 | 1/2015 | Hill | |
| 8,960,417 B2 | 2/2015 | Vasey | |
| 8,973,742 B2 | 3/2015 | Tout et al. | |
| 9,139,375 B2 | 9/2015 | Tout et al. | |
| 9,227,793 B2 | 1/2016 | Rathmann et al. | |
| 9,382,070 B2 | 7/2016 | Halbritter | |
| 9,422,112 B2 | 8/2016 | Worthington et al. | |
| 9,429,489 B2 | 8/2016 | Goldstein | |
| 9,440,797 B1 * | 9/2016 | Rimmington | E21F 13/06 |
| 9,440,800 B1 * | 9/2016 | Rimmington | B65G 43/04 |
| 9,522,789 B1 * | 12/2016 | Rimmington | B65G 23/44 |
| 9,527,675 B2 * | 12/2016 | Tout | B65G 43/00 |
| 9,571,012 B2 * | 2/2017 | DePaso | B29C 45/0005 |
| 9,592,866 B2 * | 3/2017 | Hasselbusch | G01M 17/03 |
| 9,714,140 B1 * | 7/2017 | Gray | B65G 15/30 |
| 9,730,456 B2 * | 8/2017 | Domenicucci | B65G 43/02 |
| 9,738,453 B2 * | 8/2017 | Cerny | B65G 23/44 |
| 9,758,309 B2 * | 9/2017 | Rimmington | B65G 23/44 |
| 9,772,179 B2 * | 9/2017 | Frost | G01M 13/023 |
| 9,776,803 B2 * | 10/2017 | Rimmington | E21F 13/06 |
| 9,797,251 B2 | 10/2017 | Worthington et al. | |
| 9,809,389 B2 * | 11/2017 | Pauli | G01L 1/04 |
| 9,809,393 B2 | 11/2017 | Rimmington | |
| 9,896,276 B2 | 2/2018 | Brown et al. | |
| 10,071,862 B1 | 9/2018 | Barry | |
| 10,233,026 B2 | 3/2019 | Rimmington | |
| 10,495,195 B2 * | 12/2019 | Ziegler | F16H 7/06 |
| 10,634,484 B2 | 4/2020 | Hoover et al. | |
| 10,654,656 B2 | 5/2020 | Mäder | |
| 10,807,804 B2 | 10/2020 | Kulick, III et al. | |
| 11,142,405 B2 | 10/2021 | Kulick, III et al. | |
| 11,333,563 B2 | 5/2022 | Habering et al. | |
| 2004/0066521 A1 | 4/2004 | Swab | |
| 2004/0154413 A1 | 8/2004 | Coy et al. | |
| 2005/0000367 A1 | 1/2005 | Meade | |
| 2005/0056527 A1 | 3/2005 | Weigel et al. | |
| 2005/0109581 A1 | 5/2005 | Roland | |
| 2007/0273866 A1 | 11/2007 | Bandara | |
| 2009/0301843 A1 | 12/2009 | Marisy et al. | |
| 2010/0270131 A1 | 10/2010 | Vasey | |
| 2013/0015043 A1 | 1/2013 | Tout et al. | |
| 2014/0124336 A1 * | 5/2014 | Domenicucci | A21B 1/46 198/810.02 |
| 2015/0321856 A1 | 11/2015 | De Goede et al. | |
| 2016/0347552 A1 | 12/2016 | Rimmington | |
| 2017/0006878 A1 | 1/2017 | Domenicucci et al. | |
| 2017/0297825 A1 | 10/2017 | Watson et al. | |
| 2018/0195854 A1 | 7/2018 | Hoover et al. | |
| 2019/0016538 A1 * | 1/2019 | Bogle | B65G 43/02 |
| 2019/0062068 A1 * | 2/2019 | Kreisfeld | G05B 1/04 |
| 2019/0112133 A1 | 4/2019 | Smith | |

FOREIGN PATENT DOCUMENTS

| | | |
|---|---|---|
| CN | 201109634 A | 9/2008 |
| CN | 101516746 A | 8/2009 |
| CN | 102530490 A | 7/2012 |
| CN | 106697796 A | 5/2017 |
| CN | 107555093 A | 1/2018 |
| CN | 108689106 A | 10/2018 |
| EP | 3392168 A1 | 10/2018 |
| EP | 3442885 B1 | 2/2020 |
| GB | 2493102 A | 1/2013 |
| KR | 20110128988 A | 12/2011 |
| RU | 2445457 C2 | 3/2012 |
| WO | 9745346 A1 | 12/1997 |
| WO | 03059789 A2 | 7/2003 |
| WO | 2021068472 A1 | 4/2021 |

OTHER PUBLICATIONS

U.S. Appl. No. 17/076,643, filed Oct. 21, 2020 (38 pages including cover page).
Russian Patent Office Action and Search Report for Application No. 2018136238 dated Mar. 23, 2021 (9 pages including English translation).
Chinese Patent Office Action and Search Report for Application No. 201811203826.2 dated May 6, 2021 (7 pages including statement of relevance).
United Kingdom Intellectual Propery Office Action and Search Report for Application No. GB1816761.9 dated May 5, 2021 (11 pages).
Russian Patent Office Action for Application No. 2021124050 dated Dec. 10, 2021 (14 pages including English translation).

* cited by examiner

*FIG. 7*

| First Sensor 415 | Second Sensor 420 | Third Sensor 425 | Fourth Sensor 430 | Fifth Sensor 435 | Sixth Sensor 440 | Conveyor State |
|---|---|---|---|---|---|---|
| ON | OFF | OFF | ON | OFF | OFF | Over-Tensioned |
| ON | OFF | OFF | X | ON | OFF | Adequate Tension |
| ON | OFF | OFF | X | X | ON | Adequate Tension |
| ON | OFF | OFF | OFF | OFF | OFF | Abnormal Tension |
| X | ON | OFF | ON | OFF | OFF | Adequate Tension |
| X | ON | OFF | X | ON | OFF | Adequate Tension |
| X | ON | OFF | X | X | ON | Adequate Tension |
| X | ON | OFF | OFF | OFF | OFF | Under-Tensioned |
| X | X | ON | ON | OFF | OFF | Adequate Tension |
| X | X | ON | X | ON | OFF | Adequate Tension |
| X | X | ON | X | X | ON | Under-Tensioned |
| X | X | ON | OFF | OFF | OFF | Under-Tensioned |
| OFF | OFF | OFF | ON | OFF | OFF | Abnormal Tension |
| OFF | OFF | OFF | X | ON | OFF | Under-Tensioned |
| OFF | OFF | OFF | X | X | ON | Under-Tensioned |
| OFF | OFF | OFF | OFF | OFF | OFF | Under-Tensioned |

US 11,479,417 B2

SENSOR SYSTEMS AND METHODS FOR DETECTING CONVEYOR TENSION IN A MINING SYSTEM

RELATED APPLICATIONS

This application is a continuation of U.S. application Ser. No. 16/161,607, filed Oct. 16, 2018, which claims the benefit of U.S. Provisional Patent Application No. 62/573,552, filed Oct. 17, 2017, the entire content of each of which is hereby incorporated by reference.

BACKGROUND

This invention relates to methods and systems used for detecting tension of a conveyor, such as an armored face conveyor ("AFC") or a beam stage loader ("BSL").

SUMMARY

In one embodiment, the invention provides a conveyor system that includes a sprocket, a conveyor element, a sensor, a tensioning system, and an electronic processor. The conveyor element is coupled to the sprocket to move around the sprocket. The sensor is positioned adjacent to the sprocket and configured to generate an output signal indicative of a detection of the conveyor element. The electronic processor is coupled to the sensor and to the tensioning system. The electronic processor is configured to receive the output signal from the sensor, estimate a trajectory of the conveyor element based on the output signal, determine a value for slack distance based on the estimated trajectory of the conveyor element, and control the tensioning system based on the value for slack distance.

In another embodiment, the invention provides a computer-implemented method for controlling tension in a conveyor element of a conveyor system. The conveyor system includes the conveyor element, a sprocket, a sensor, a tensioning system, and a processor. The method includes receiving, at the processor, an output signal from a sensor positioned adjacent to the sprocket, estimating, using the processor, a trajectory of the conveyor element based on the output signal from the sensor, determining, using the processor, a value for slack distance based on the estimated trajectory of the conveyor element, and controlling, using the processor, the tensioning system based on the value for slack distance.

In another embodiment, the invention provides a controller for controlling tension in a conveyor element of a conveyor system. The controller includes a non-transitory computer readable medium and a processor. The controller includes computer executable instructions stored in the computer readable medium for controlling the operation of the conveyor system to receive an output signal from a sensor positioned adjacent to a sprocket, estimate a trajectory of a conveyor element based on the output signal from the sensor, determine a value for slack distance based on the estimated trajectory of the conveyor element, and control a tensioning system based on the value for slack distance.

In another embodiment, the invention provides a conveyor system that includes a sprocket, a conveyor element, a sensor, a tensioning system, and an electronic processor. The conveyor element is coupled to the sprocket to move around the sprocket. The sensor is positioned adjacent to the sprocket. The sensor is configured to generate an analog output signal indicative of a distance between the sensor and the conveyor element. The electronic processor is connected to the sensor and the tensioning system. The electronic processor is configured to receive the analog output signal from the sensor, determine whether a value for the analog output signal is within a predetermined range, determine a tension correction amount based on the analog output signal when the analog output signal is outside the predetermined range, and control the tensioning system based on the tension correction amount.

Before any embodiments of the invention are explained in detail, it is to be understood that the invention is not limited in its application to the details of the configuration and arrangement of components set forth in the following description or illustrated in accompanying drawings. The invention is capable of other embodiments and of being practiced or of being carried out in various ways. Also, it is to be understood that the phraseology and terminology used herein are for the purpose of description and should not be regarded as limiting. The user of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Other aspects of the invention will become apparent by consideration of the detailed description and accompanying drawings.

BRIEF DESCRIPTION OF THE DRAWINGS

FIG. 7 is a chart illustrating relationships between different combinations of output signals from a sensor assembly and a corresponding conveyor state.

DETAILED DESCRIPTION

Figure 1:
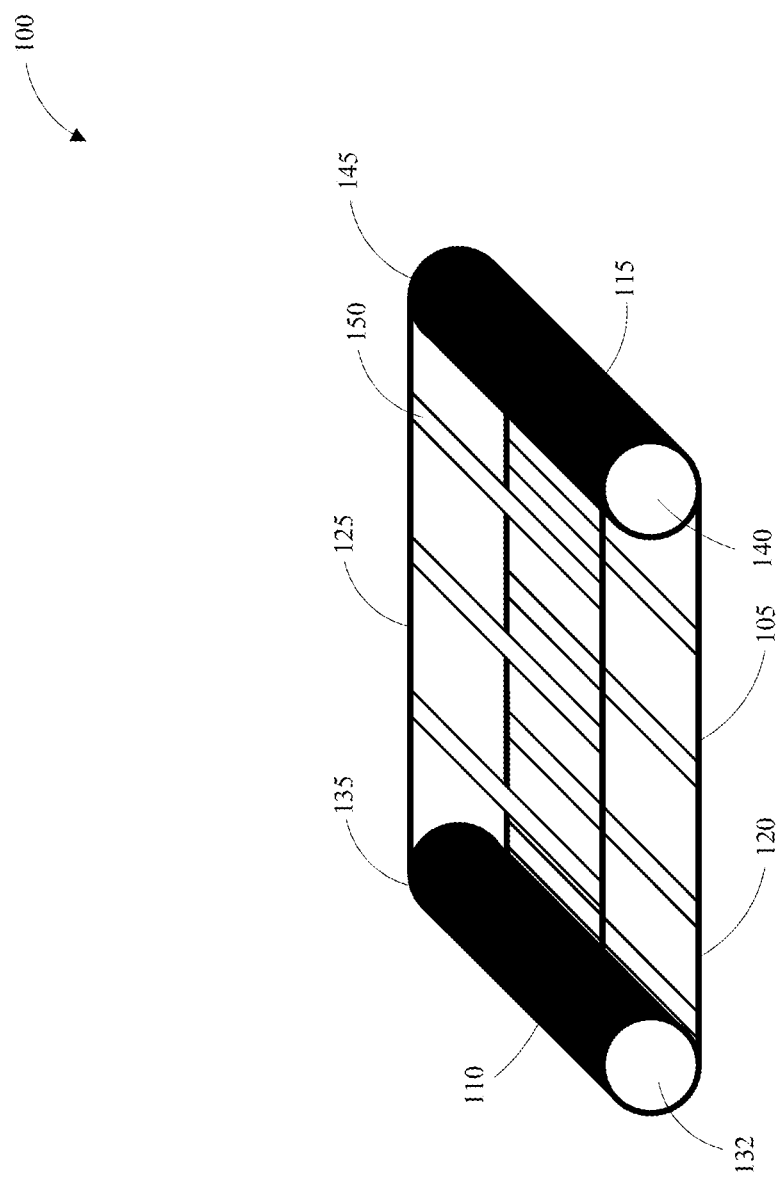
FIG. 1 is a schematic diagram of a conveyor system.

Conveyor systems are typically used in mining operations to transport material. In longwall mining, for example, the beam stage loader conveyor system is used to transport the mined coal from the armored face conveyor ("AFC") to the main conveyor that transports the coal to the surface. FIG. 1 illustrates a schematic diagram of a conveyor system 100 used for transporting mineral material. As shown in FIG. 1, the conveyor system 100 includes a conveyor 105, a first conveyor shaft 110, a second conveyor shaft 115, a first conveyor chain 120, and a second conveyor chain 125. In some embodiments, the conveyor 105 may include more or fewer conveyor chains. In some embodiments, the conveyor chains 120, 125 are replaced by a different conveyor element such as a belt, or the like. The conveyor system 100 is at least partially supported by a frame 130 (see FIG. 3). In some embodiments, the frame 130 includes a first end portion to support the first conveyor shaft 110, a second end portion to support the second conveyor shaft 115, and a portion to support the first and second conveyor chains 120, 125 or other conveyor element. The first conveyor chain 120 and the second conveyor chain 125 (e.g., the conveyor elements) are positioned around the first conveyor shaft 110 and the second conveyor shaft 115 to form the conveyor 105. As shown in FIG. 1, the first conveyor chain 120 is positioned around a first end of the first conveyor shaft 110 and around a first end of the second conveyor shaft 115 while the second conveyor chain 125 is positioned around a second end of the first conveyor shaft 110 and around a second end of the second conveyor shaft 115.

Each conveyor shaft 110, 115 includes a sprocket for each conveyor element. The sprocket engages the conveyor element to turn the conveyor element around the sprocket. In the illustrated embodiment, each conveyor shaft 110, 115 includes two sprockets. In the illustrated embodiment, a first sprocket 132 on the first conveyor shaft 110 engages the first conveyor chain 120 and a second sprocket 135 on the first conveyor shaft 110 engages the second conveyor chain 125. Similarly, a third sprocket 140 on the second conveyor shaft 115 engages the first conveyor chain 120 and a fourth sprocket 145 on the second conveyor shaft 115 engages the second conveyor chain 125. The sprockets 132, 135, 140, 145 are driven by one or more drive mechanisms (e.g., motors), which causes movement of the chains 120, 125 around the first conveyor shaft 110 and the second conveyor shaft 115 such that the conveyor 105 transports the mining material. In the illustrated embodiment, the conveyor 105 includes flightbars 150 that assist in transporting the mining mineral with the conveyor 105. As shown in FIG. 1, the flightbars are supported by the first and second conveyor chains 120, 125. In some embodiments, the conveyor 105 also includes chain covers to cover and protect the conveyor chains 120, 125.

In the illustrated embodiment, to conveyor system 100 is part of the beam stage loader of a longwall mining system. In other embodiments, however, the conveyor system 100 may be part of a different mining machine such as, for example, an armored face conveyor, a feeder breaker, the main conveyor in a longwall mining system, and the like.

Figure 2:
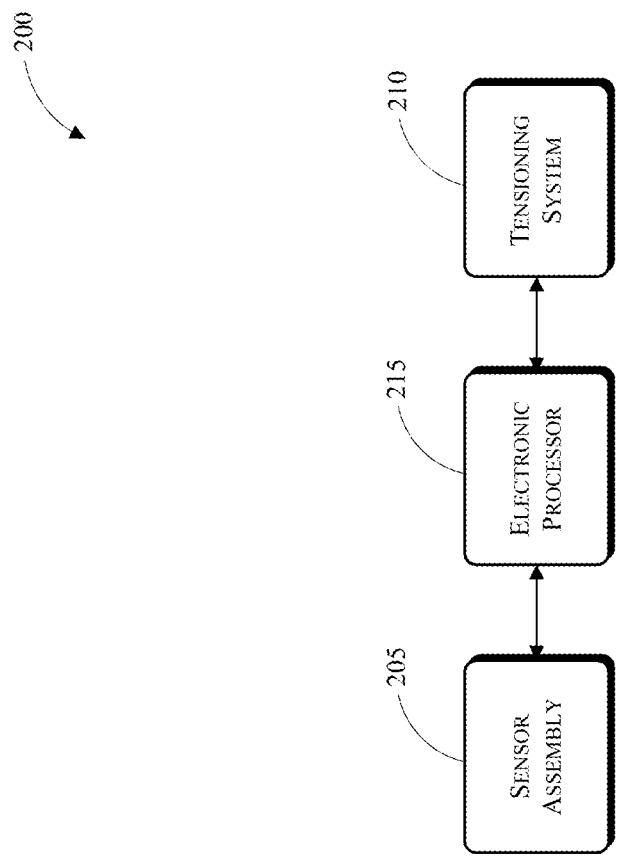
FIG. 2 is a block diagram of a control system for the conveyor system of FIG. 1.

FIG. 2 illustrates a block diagram of a control system 200 for the conveyor system 100. The control system 200 is configured to maintain the conveyor system 100 within an adequate tension range. When the conveyor 105 is improperly tensioned (e.g., the tension of the conveyor 105 is outside of an adequate tension range), the mining material may not be efficiently transported. Additionally, the conveyor 105 may be more susceptible to wear, malfunction, or a combination thereof when the conveyor 105 is improperly tensioned. The adequate tension range may vary based on, for example, the material being transported by the conveyor 105, the type of conveyor element utilized, the speed at which the conveyor 105 is operated, or combinations thereof. For example, adequate tension for the conveyor 105 corresponds to an amount of tension that is not too high or too low. Tension that is too high in the conveyor 105 could damage the conveyor 105 as more material is added to the conveyor 105 (e.g., could cause a breakage of the conveyor 105). Tension that is too low in the conveyor 105 can cause slack chain (e.g., distance between a sprocket and a conveyor chain). An adequate tension in the conveyor corresponds to circumstances where, given the current operational state of the conveyor 105, the tension is not too high or too low.

As shown in FIG. 2, the control system 200 includes a sensor assembly 205, a tensioning system 210, and an electronic processor 215. The sensor assembly 205 is configured to generate an output signal based on its detection of the conveyor elements (e.g., the first and second conveyor chains 120, 125). The electronic processor 215 is, for example, a controller that includes a processing unit and a memory. The memory can be a non-transitory computer-readable medium operable for storing executable instructions that can be retrieved by the processor and executed by the processor. The executable instructions correspond to the various control techniques and processes described herein. The terms electronic processor and controller are used interchangeably herein.

The tensioning system 210 changes the distance between the first conveyor shaft 110 and the second conveyor shaft 115. The distance between the first conveyor shaft 110 and the second conveyor shaft 115 set the tension of the conveyor 105. As the distance between the first and the second conveyor shafts 110, 115 increases, the tension of the conveyor 105 also increases. Conversely, when the distance between the first and second conveyor shafts 110, 115 decreases, the tension of the conveyor 105 decreases. In some embodiments, the tensioning system 210 includes a first hydraulic cylinder coupled to the first conveyor shaft 110 and a second hydraulic cylinder coupled to the second conveyor shaft 115. In other embodiments, the tensioning system 210 may include more or fewer hydraulic cylinders. The hydraulic cylinders change the position of the respective conveyor shafts 110, 115 to thereby change the distance between the first and second conveyor shafts 110, 115. As discussed above, when the distance between the first and the second conveyor shafts 110, 115 changes, the tension of the conveyor 105 also changes. The hydraulic cylinders may be driven by, for example, a hydraulic system.

As shown in FIG. 2, the electronic processor 215 is coupled to the sensor assembly 205 and the tensioning system 210. In particular, the electronic processor 215 receives the output signal(s) from the sensor assembly 205, determines whether the conveyor 105 is within an adequate tension range based on the output signal(s), and activates the tensioning system 210 when the conveyor 105 is outside the adequate tension range, or when the electronic processor 215 predicts that the conveyor 105 will be outside the adequate tension range without preventative action by the tensioning system 210. In one embodiment, the tensioning system 210 includes a hydraulic and/or electronic system to drive the hydraulic cylinders. In such an embodiment, the electronic processor 215 transmits an activation signal to the tensioning system 210 when the distance between the first and the second conveyor shafts 110, 115 is to be changed.

Figure 3:
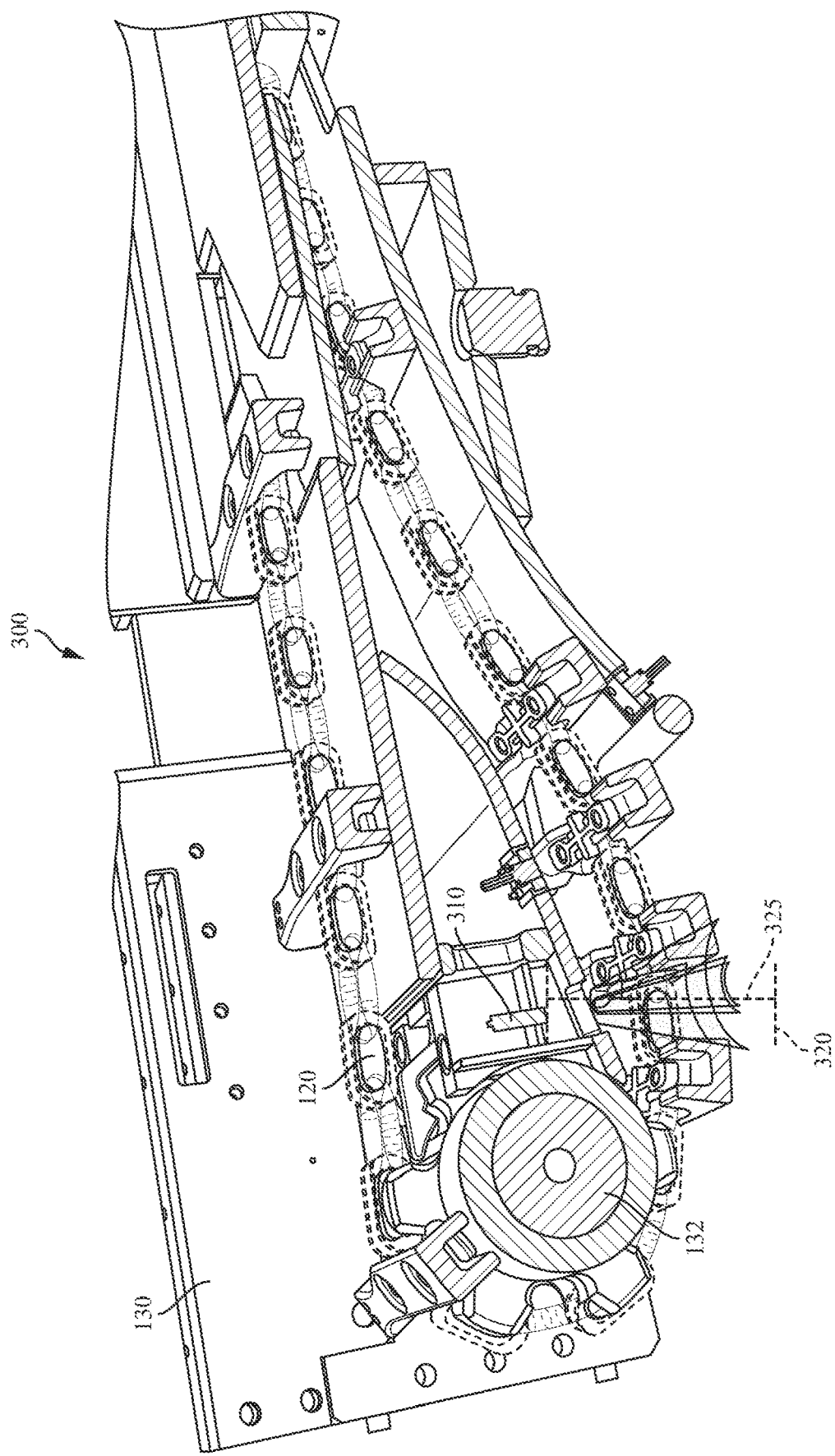
FIG. 3 illustrates a sensor assembly of the control system of FIG. 2, according to an embodiment of the invention.

FIG. 3 illustrates an embodiment 300 of the sensor assembly 205. In the illustrated embodiment 300, the sensor assembly 205 includes an analog output sensor 310 for each conveyor element (i.e., each conveyor chain 120, 125). For example, a first analog output sensor 310 detects a characteristic of the first conveyor chain 120 and a second analog output sensor 310 detects a characteristic of the second conveyor chain 125. Although FIG. 3 illustrates only a single analog output sensor 310 positioned adjacent the first sprocket 132 to detect a characteristic of the first conveyor chain 120, a second analog output sensor 310 is similarly positioned adjacent the second sprocket 135 or the fourth sprocket 145 to detect a characteristic of the second conveyor chain 125. In some embodiments, additional analog output sensors may be positioned adjacent the third sprocket 140 to obtain a second measurement of the tension of the first conveyor chain 120, and another sensor may be positioned adjacent the fourth sprocket 145 to obtain a second measurement of the tension of the second conveyor chain 125. As shown in FIG. 3, the analog output sensor 310 is supported by the frame 130 near the discharge point of the first conveyor chain 120 (e.g., the conveyor element).

Figure 4:
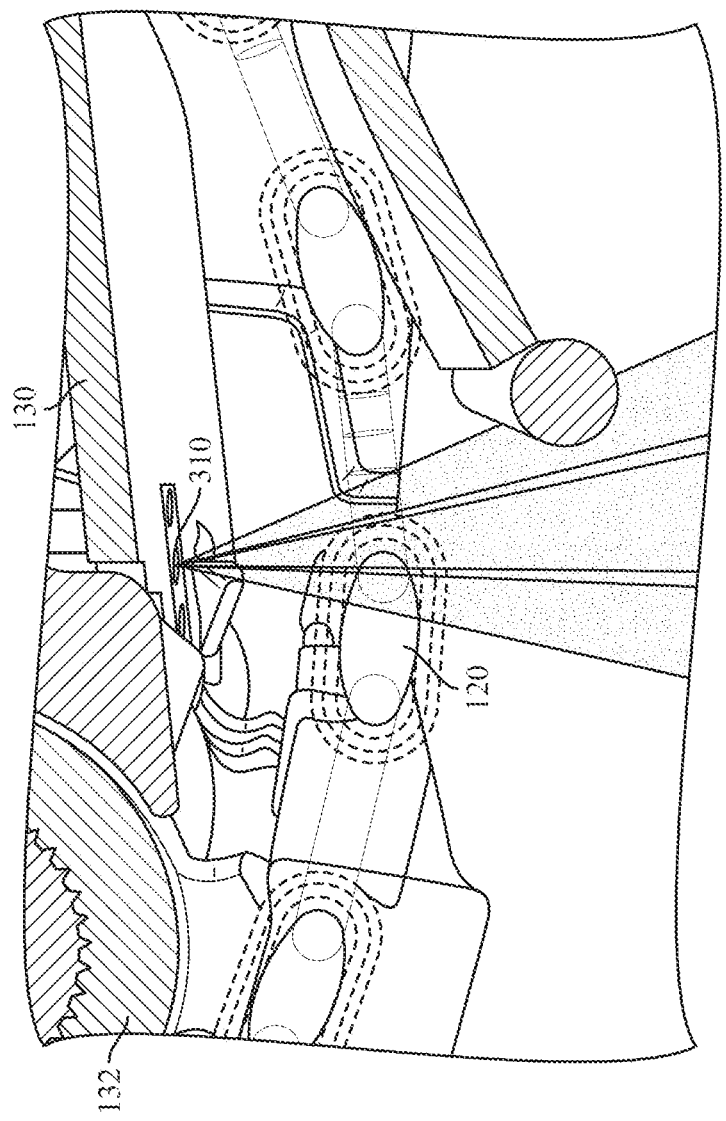
FIG. 4 illustrates an underside perspective view of the analog output sensor of FIG. 3.

The analog output sensor 310 may be, for example, an ultrasonic sensor, an IR sensor, a magnetometer, and the like. The analog output sensor 310 generates an analog output signal indicative of a distance between the analog output sensor 310 and the first conveyor chain 120. In particular, the analog output signal has a variable output range such as, for example, 0-10V, 200-500 MHz, 100-300 μF, and the like. The value (e.g., magnitude) of the analog output signal is linearly related to the distance between the analog output sensor 310 and the first conveyor chain 120. In the illustrated embodiment, the analog output signal increases in value as the distance between the analog output sensor 310 and the first conveyor chain 120 decreases. That is, the analog output sensor 310 outputs a minimum value when the first conveyor chain 120 is positioned at an edge 320 of a detection area 325 of the analog output sensor 310. The analog output sensor 310 thereby gives at least an indirect measure of the slack distance of the first conveyor chain 120. The electronic processor 215 can then determine whether the tensioning system 210 is to be activated (e.g., whether the conveyor 105 needs to change its tension). Because the analog output sensor 310 generates a variable output signal, the control by the tensioning system 210 may be more precise than, for example, using a switch-like detector for the slack distance of the conveyor chains 120, 125. Additionally, a single analog output sensor 310 generates more precise information than using switch-like detectors that only generate binary outputs. Accordingly, by using the analog output sensor 310, a reduction of the overall number of components may be achieved. In some embodiments, the analog output sensor 310 utilizes a time-of-flight measurement to generate the analog output signal. In other embodiments, however, different measurement techniques are utilized to generate the analog output signal. FIG. 4 illustrates another perspective of the placement for the analog output sensor 310. In particular, FIG. 4 illustrates a underside perspective view of the analog output sensor 310. In the illustrated embodiment, the analog output sensor 310 is an ultrasonic sensor configured to generate a variable output signal indicative of the distance between the analog output sensor 310 and the first conveyor chain 120.

Figure 5:
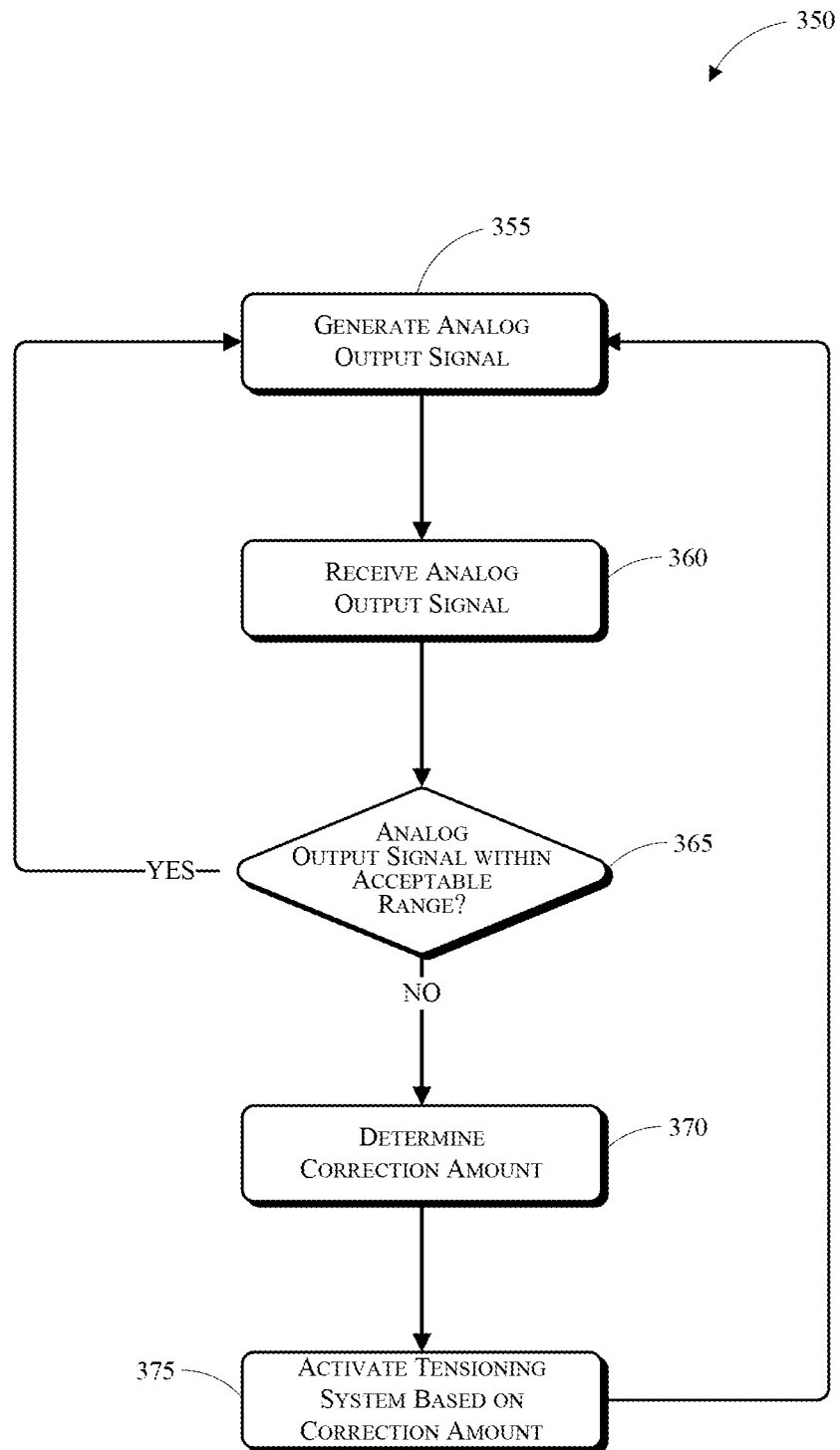
FIG. 5 is a process for maintaining tension in the conveyor system of FIG. 1 using the sensor assembly of FIG. 3.

FIG. 5 is a flowchart illustrating a method 350 of maintaining the conveyor system 100 at an adequate tension using the embodiment 300 of the sensor assembly 205 in either the placement shown in FIG. 3 or the placement shown in FIG. 4. In STEP 355, the analog output sensor 310 generates an analog output signal indicative of a distance between the analog output sensor 310 and the first conveyor chain 120. The electronic processor 215 receives the analog output signal (STEP 360) and determines whether the analog output signal is within an acceptable range (STEP 365). The acceptable range is predetermined and stored. The electronic processor 215 accesses the acceptable range and compares a magnitude of the analog output signal to the acceptable range. In some embodiments, the electronic processor 215 may, for example, consult a look-up table storing different magnitudes of the analog output signal and indicating whether the particular magnitude or range of magnitudes is acceptable. The acceptable range for the analog output signal preferably falls approximately halfway through the possible outputs of the analog output sensor 310. For example, when the analog output sensor 310 has an output range of approximately 0V-10V, the acceptable range may be, for example, 4V-6V.

When the analog output signal is within the acceptable range, the electronic processor 215 continues to monitor the first conveyor chain 120 and receiving the analog output signal from the analog output sensor 310. On the other hand, when the analog output signal is outside the acceptable range, the electronic processor 215 determines a correction amount (STEP 370). The correction amount indicates an amount that the conveyor 105 needs to increase or decrease in tension. Because the analog output signal provides a variable output signal, the magnitude of the analog output signal can be used to more precisely determine an amount by which the tension of the conveyor 105 is to be changed.

In one embodiment, the electronic processor 215 determines the correction amount by calculating a difference between the analog output signal and the acceptable range. For example, when the analog output signal is 2V (e.g., indicating that the first conveyor chain 120 is under-tensioned), the electronic processor 215 may determine the correction amount by calculating the difference between 4V (e.g., the lowest value in the acceptable range) and the analog output signal of 2V. The electronic processor 215 calculates the difference to be approximately 2V.

In some embodiments, the electronic processor 215 converts the difference of the acceptable range and the analog output signal into a corresponding change in distance between the first conveyor shaft 110 and the second conveyor shaft 115. In the example above, the electronic processor 215 may then determine the difference of 2V to correspond to a change of approximately 10 inches between the first conveyor shaft 110 and the second conveyor shaft 115. The electronic processor 215 may assign a direction to the correction amount to indicate whether the tensioning system 210 is to increase the tension of the conveyor 105 or reduce the tension of the conveyor 105. For example, when the analog output signal indicates that the conveyor 105 is over-tensioned, the electronic processor 215 may set the correction amount to a negative value (for example, −2V) to indicate that the tensioning system 210 is to decrease the tension of the conveyor 105.

After determining the correction amount, the electronic processor 215 sends a control signal to activate the tensioning system 210 based on the correction amount (STEP 375). In particular, the electronic processor 215 sends an activation signal to the tensioning system 210 such that the tensioning system 210 changes the distance between the first conveyor shaft 110 and the second conveyor shaft 115 by the correction amount. In some embodiments, the tensioning system 210 may include a timer that sets a duration during which the tensioning system 210 is activated to change the distance between the first conveyor shaft 110 and the second conveyor shaft 115. In such embodiments, the correction amount may correspond to a duration of the timer. In the example above where the difference between the analog output signal and the acceptable range is 2V, the correction amount may be, for example, 10 seconds. The duration of the timer (e.g., the correction amount) may, in such embodiments, be based on the average speed of the tensioning system 210. The speed of the tensioning system 210 may be a predetermined amount stored (or accessed from memory) by the electronic processor 215. The electronic processor 215 then returns to STEP 355 and continues to monitor the analog output signal with respect to the acceptable range.

Figure 6:
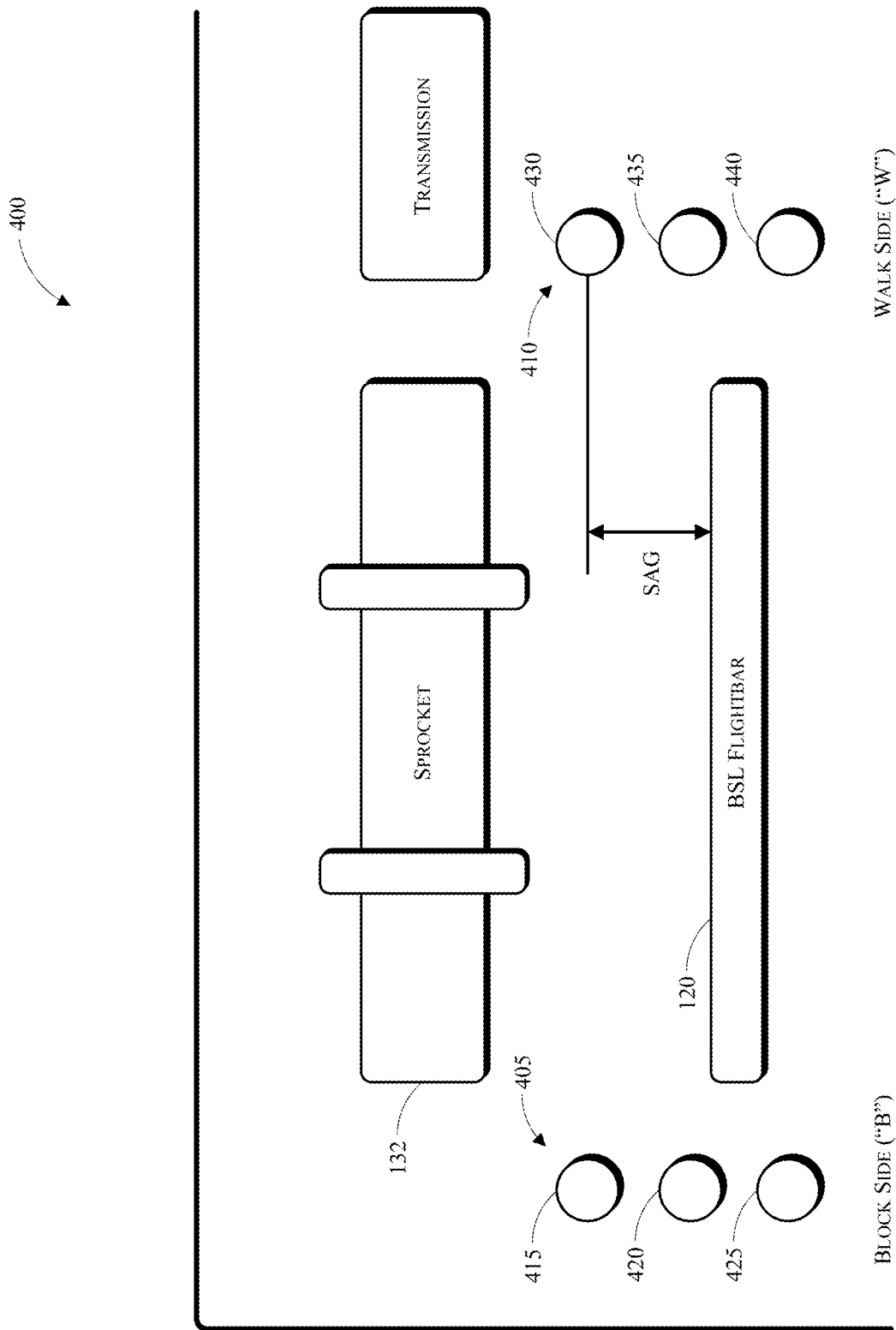
FIG. 6 illustrates a sensor assembly of the control system of FIG. 2, according to an embodiment of the invention.

FIG. 6 illustrates another embodiment 400 of the sensor assembly 205. In the illustrated embodiment 400, the sensor assembly 205 includes two sets of proximity sensors, 405, 410. The first set 405 of proximity sensors is positioned on a block side of the conveyor 105 (e.g., to the outside of the first sprocket 132). The first set 405 of proximity sensors includes a first proximity sensor 415, a second proximity sensor 420, and a third proximity sensor 425. The second set 410 of proximity sensors is positioned on a walk side of the conveyor 105 (e.g., to the inside of the first sprocket 132). The second set 410 of proximity sensors includes a fourth proximity sensor 430, a fifth proximity sensor 435, and a sixth proximity sensor 440. In the illustrated embodiment, each of the proximity sensors 415-440 is energized as the first conveyor chain 120 (or a flightbar 150) is detected. In the illustrated example, the proximity sensors 415-440 are inductive proximity switch sensors with an approximate detection range of 40 mm. Accordingly, each of the proximity sensors 415-440 generates a binary output signal that is transmitted to the electronic processor 215. In some embodiments, the proximity sensors 415-440 may be longer range IR, lasers, and the like. As explained in further detail below, the electronic processor 215 determines whether the tensioning system 210 needs to be activated based on the combination of binary output signals received from the first and second sets 405, 410 of proximity sensors. In other embodiments, the first and second sets 405, 410 of proximity sensors may include more or fewer proximity sensors. In the illustrated embodiment, the precision of the embodiment 400 of the sensor assembly 205 is improved by increasing the number of proximity sensors 415-440 and decreasing a distance between each of the proximity sensors 415-440.

As shown in FIG. 6, the first, second and third proximity sensors 415, 420, 425 are arranged linearly, with the first proximity sensor 415 positioned closest to the first sprocket 132 and the third proximity sensor 425 positioned furthest from the first sprocket 132. Similarly, the fourth, fifth, and sixth proximity sensors 430, 435, 440 are arranged linearly, with the fourth proximity sensor 430 positioned closest to the first sprocket 132 and the sixth proximity sensor 440 positioned furthest from the first sprocket 132. The first and fourth proximity sensors 415, 430 are positioned at a first height (e.g., a distance from the first sprocket 132 or support frame). Similarly, the second and the fifth proximity sensors 420, 435 are positioned at a second height different than the first height, and the third and the sixth proximity sensors 425, 440 are positioned at a third height different than the first and second heights. In the illustrated embodiment, the first height corresponds to a slack distance of 0 mm, the second height corresponds to a slack distance of 75 mm, and the third height corresponds to a slack distance of 150 mm. That is, when the first conveyor chain 120 is at the first height, the first conveyor chain 120 has 0 mm of slack distance, when the first conveyor chain 120 is at the second height, the first conveyor chain 120 has 75 mm of slack distance, and when the first conveyor chain 120 is at the third height, the first conveyor chain 120 has 150 mm of slack distance. Because the first set 405 of proximity sensors and the second set 410 of proximity sensors are positioned on opposite sides of the first sprocket 132, a combination of the outputs of each proximity sensor provides more accurate information about the slack distance of the first conveyor chain 120 and accordingly, regarding the tension of the conveyor 105.

FIG. 7 illustrates an exemplary chart indicating the different combinations of sensor outputs, and what each combination indicates with respect to a state of the tension of the conveyor 105. The exemplary chart illustrates an "X" where the signal from that particular sensor is inconsequential to the determination of the state of the conveyor 105. Because the proximity sensors in each set 405, 410 are arranged linearly, the signal from the proximity sensor that is furthest from the sprocket 132 indicates the slack distance of the first conveyor chain 120, and therefore the signal from the proximity sensors that are closer to the sprocket 132 are not taken into consideration to determine the tension state of the conveyor 105. For example, when the second sensor 420 outputs a positive signal (e.g., indicating that the first conveyor chain 120 is within the detection range of the second sensor), the output of the first sensor 415 is inconsequential to determining the tension state of the conveyor 105 and is, therefore, set to "X."

Based on the illustrated chart, an over-tensioned state of the conveyor 105 is indicated when a positive signal is received from the first sensor 415 and the fourth sensor 430 (e.g., the first conveyor chain 120 is within the detection range of the first sensor 415 and the fourth sensor 430), and a negative signal is received from the second, third, fifth, and sixth sensors 420, 425, 435, 440 (e.g., the first conveyor chain 120 is outside the detection range of the second, third, fifth, and sixth sensors). As also illustrated in the exemplary chart, an under-tensioned state of the conveyor 105 is indicated by six different output combinations from the proximity sensors 415-440. Additionally, by utilizing the sensor arrangement of FIG. 6, abnormal conditions of the conveyor 105 may also be detected. In the illustrated embodiment, abnormal conditions of the conveyor 105 may be indicated when, for example, the first sensor 415 outputs a positive signal, but the second set 410 of sensors output negative signals, and separately, when the fourth sensor 430 outputs a positive signal, but the first set 405 of sensors output negative signals. Such outputs may indicate, for example, that the conveyor is bent or encountering an abnormal load condition. A lack of positive signal from the first set 405 or the second set 410 of proximity sensors may also indicate that one of the proximity sensors is malfunctioning.

Figure 8:
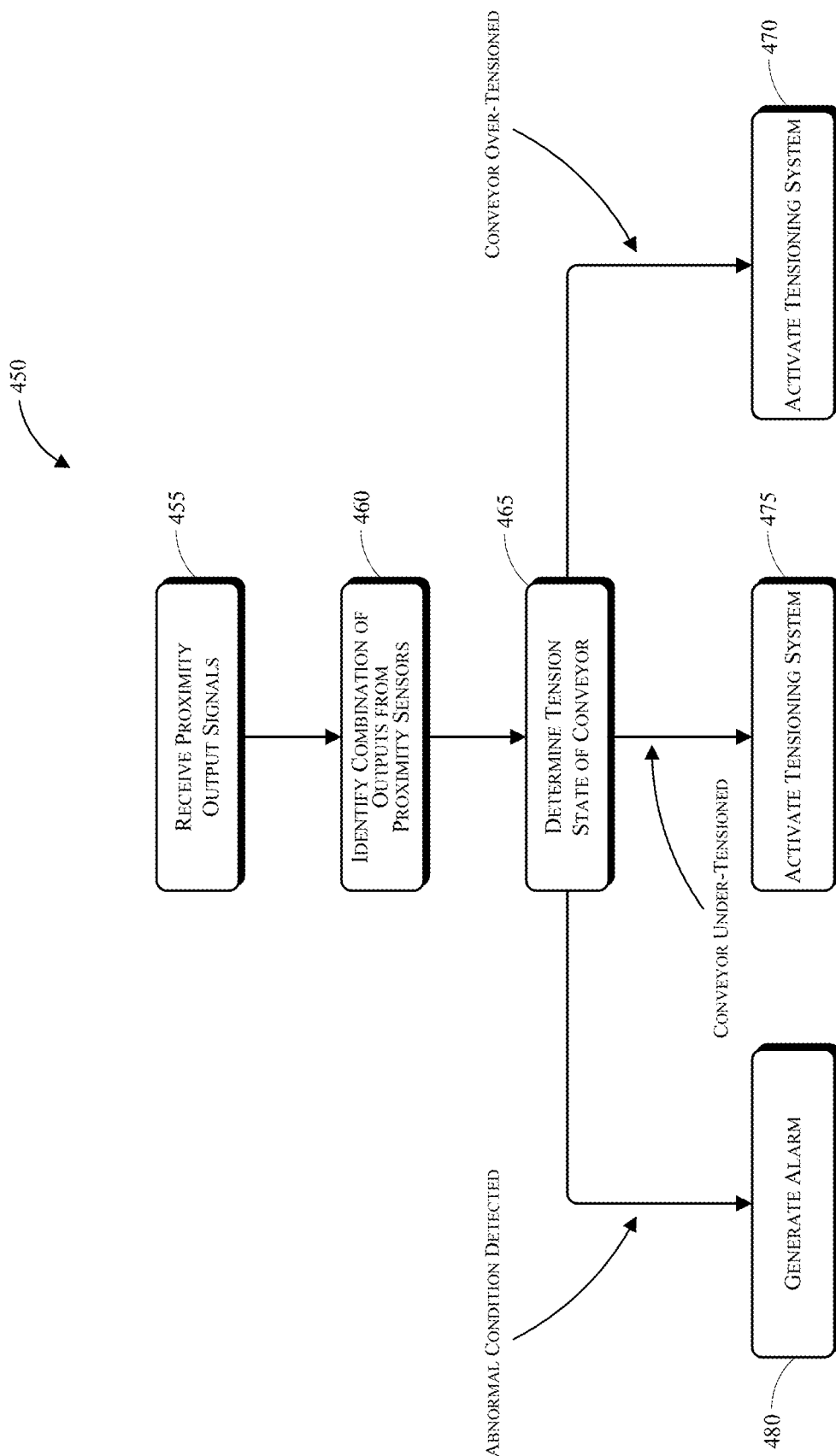
FIG. 8 is a process for maintaining tension in the conveyor system of FIG. 1 using the sensor assembly of FIG. 6.

FIG. 8 illustrates a method 450 of maintaining the conveyor system 100 at an adequate tension using the embodiment 400 of the sensor assembly 205. In STEP 455, the electronic processor 215 receives output signals from each of the proximity sensors 415-440. The electronic processor 215 then identifies an applicable combination of outputs from the proximity sensors 415-440 (STEP 460). For example, the electronic processor 215 may determine which combination of outputs from the exemplary chart of FIG. 7 matches the proximity output signals received by the electronic processor 215. In some embodiments, the electronic processor 215 may access a look-up table similar to the exemplary chart of FIG. 7 from memory. In other embodiments, however, the electronic processor 215 may apply rules and thresholds in software to determine the combination of outputs that matches the output signals received by the electronic processor 215. The electronic processor 215 then determines a tension state of the conveyor 105 based on the combination of proximity output signals received by the electronic processor 215 (STEP 465).

When the electronic processor 215 determines that the conveyor 105 is over-tensioned, the electronic processor 215 activates the tensioning system 210 to decrease the tension of the conveyor 105 (STEP 470). On the other hand, when the electronic processor 215 determines that the conveyor 105 is under-tensioned, the electronic processor 215 activates the tensioning system 210 to increase the tension of the conveyor 105 (STEP 475). In some embodiments, the electronic processor 215 may also detect abnormal conditions of the conveyor 105 based on the proximity output signals received by the electronic processor 215. When the electronic processor 215 detects an abnormal condition, an alarm is generated (STEP 480). In some embodiments, the alarm may be communicated to an operator via, for example, a human-machine interface, a speaker, or an external device (e.g., smartphone, cellular phone, tablet, laptop computer, desktop computer, and the like). As shown in FIG. 8, the electronic processor 215 continues to monitor the proximity output signals at STEP 455 to continue to monitor the tension of the conveyor 105.

Figure 9:
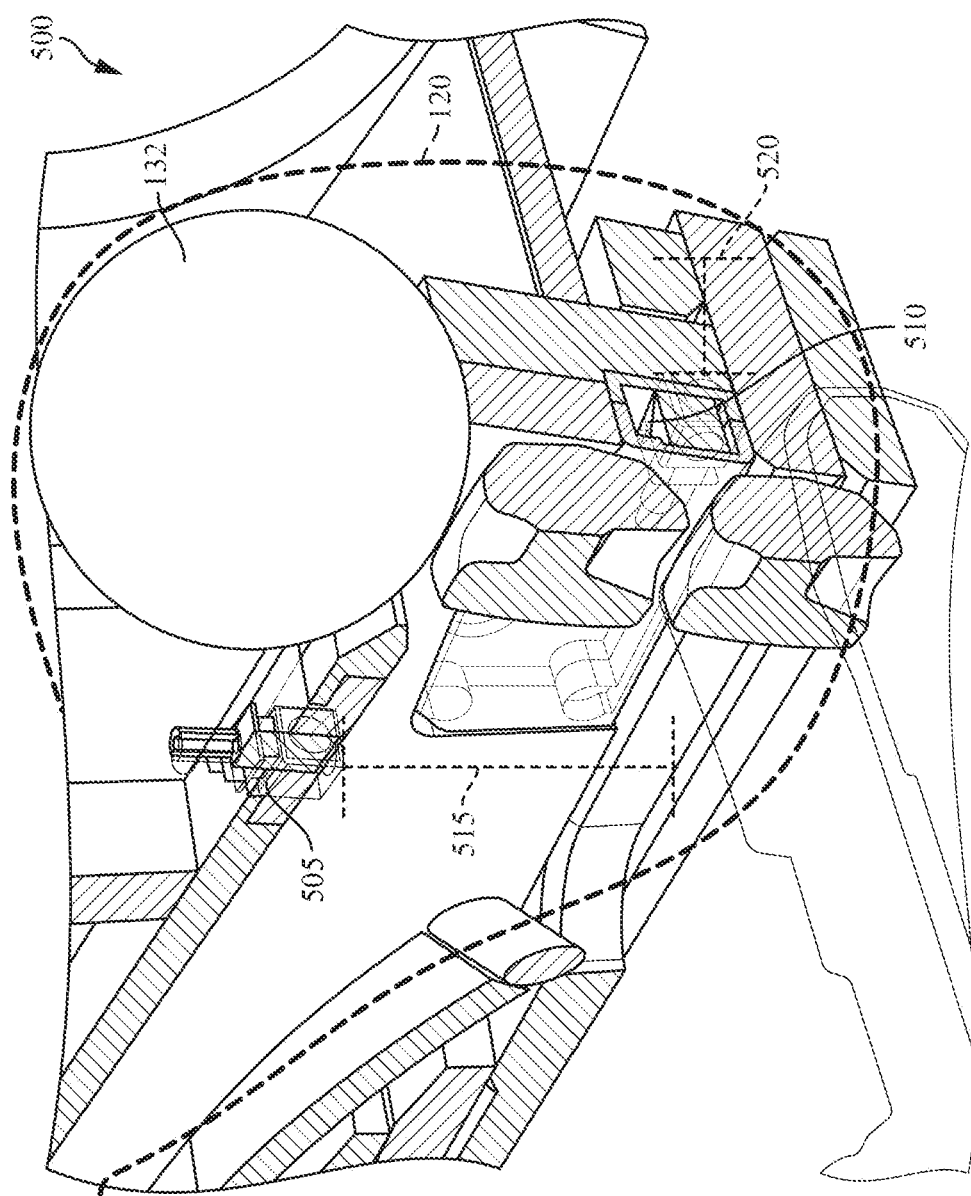
FIG. 9 illustrates a sensor assembly of the control system of FIG. 2, according to an embodiment of the invention.

FIG. 9 illustrates another embodiment 500 of the sensor assembly 205. In the illustrated embodiment 500, the sensor assembly 205 includes a first proximity sensor 505 and a second proximity sensor 510. As shown in FIG. 9, the first proximity sensor 505 has a first detection direction illustrated by arrow A, while the second proximity sensor 510 has a second detection direction illustrated by arrow B. In the illustrated embodiment, the first detection direction is approximately perpendicular to the second detection direction. Similar to the proximity sensors 415-440 of the second embodiment 400, the first and second proximity sensors 505, 510 are also energized as the first conveyor chain 120 (or a flightbar 150) is detected. Accordingly, the first and second proximity sensors 505, 510 generate a binary output signal indicating whether the first conveyor chain 120 (or flightbar) is within a detection range of the sensors 505, 510.

In the illustrated embodiment, the first proximity sensor 505 detects a vertical distance between the first proximity sensor 505 and the first conveyor chain 120. The second proximity sensor 510 detects a horizontal distance between the second proximity sensor 510 and the first conveyor chain 120. FIG. 9 illustrates an example of when the conveyor 105 is under-tensioned and the first conveyor chain 120 is outside a first detection range 515 of the first proximity sensor 505 and outside a second detection range 520 of the second proximity sensor 510.

When the embodiment 500 of the sensor assembly 205 is utilized, the electronic processor 215 performs a method similar to method 450 shown in FIG. 8. For example, the electronic processor 215 receives the output signals from the first and second proximity sensors 505, 510 and determines, based on the combination of the output signals whether the first conveyor chain 120 is under-tensioned, over-tensioned, or within an acceptable tension range. For example, as illustrated in FIG. 9, when the first and second proximity sensors 505, 510 generate a negative (or a null) signal, the electronic processor 215 determines that the conveyor 105 is under-tensioned. On the other hand, when only one of the proximity sensors 505, 510 generates a positive signal, the electronic processor 215 determines that the conveyor 105 is adequately tensioned. Finally, when both the first and second proximity sensors 505, 510 generate a positive signal, the electronic processor 215 determines that the conveyor is over-tensioned. The electronic processor 215 may then activate the tensioning system when the conveyor 105 is outside the adequate tension range.

Figure 10C:
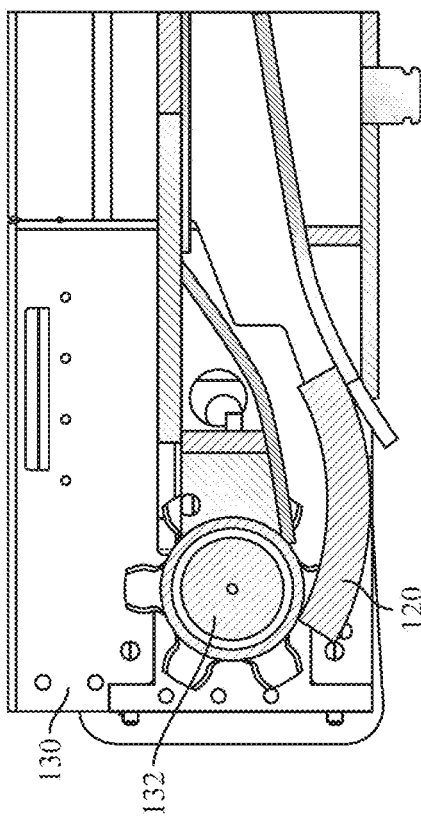
FIGS. 10A-10D illustrate chain trajectories for the conveyor system of FIG. 1.
Figure 10D:
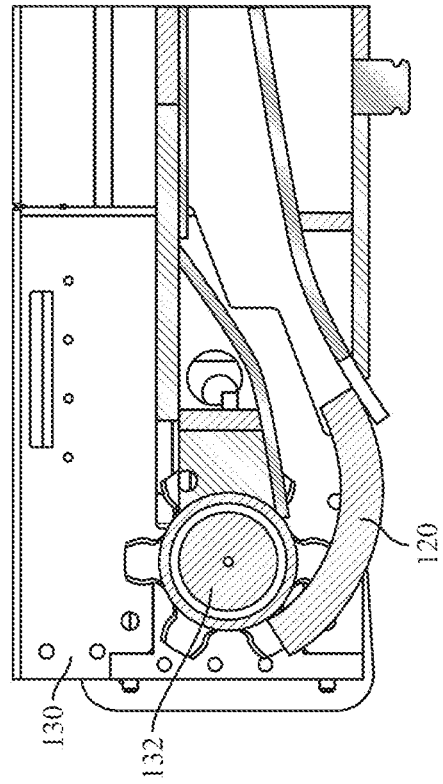
Figure 10A:
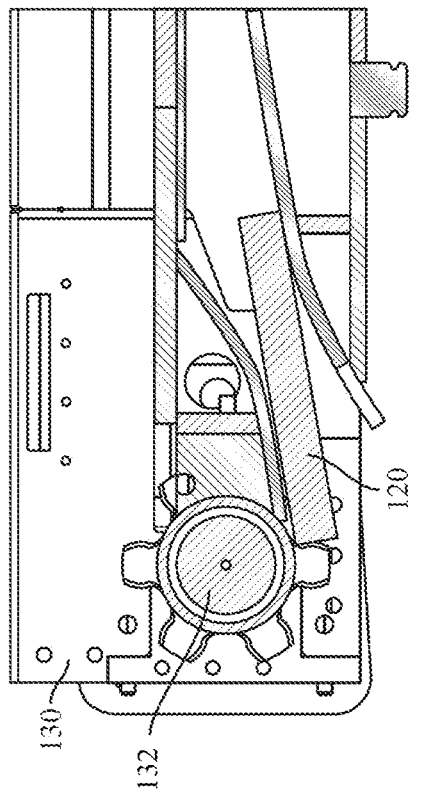
Figure 10B:
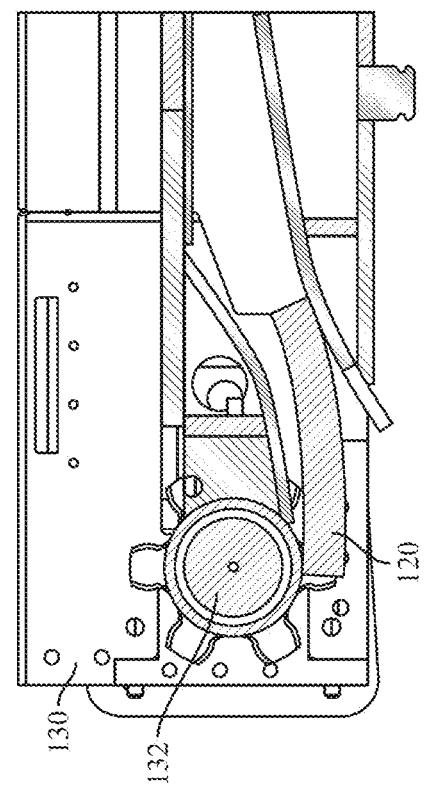

In some embodiments, the electronic processor 215 receives the proximity output signals using the sensor embodiment 400 or the sensor embodiment 500 of the sensor assembly 205 and generates an estimated chain trajectory based on the output signals from the various proximity sensors 415-440, 505, 510. FIGS. 10A-10D, for example, illustrate various generated chain trajectories based on the output signals from the proximity sensors. Notably, the chain trajectory may also be generated based on the output from the analog output sensor 310, or, in some embodiments, from a plurality of analog output sensors 310 used together. FIG. 10A illustrates a generated chain trajectory in which the first conveyor chain 120 is over-tensioned and has a slack distance of approximately 0 mm. FIGS. 10B and 10C illustrate generated chain trajectories in which the first conveyor chain 120 is properly tensioned and has a slack distance of 50 mm (FIG. 10B) and 100 mm (FIG. 10C), respectively. FIG. 10D illustrates a generated chain trajectory in which the first conveyor chain 120 is under-tensioned and has a slack distance of approximately 150 mm. In embodiments in which the chain trajectory is generated, the electronic processor 215 may use the output signals from the proximity sensors 415-440, 505, 510 or the analog output sensor 310 to generate the estimated chain trajectory, and may then determine the slack distance from the generated chain trajectory instead of directly from the output sensor signals.

Figure 11:
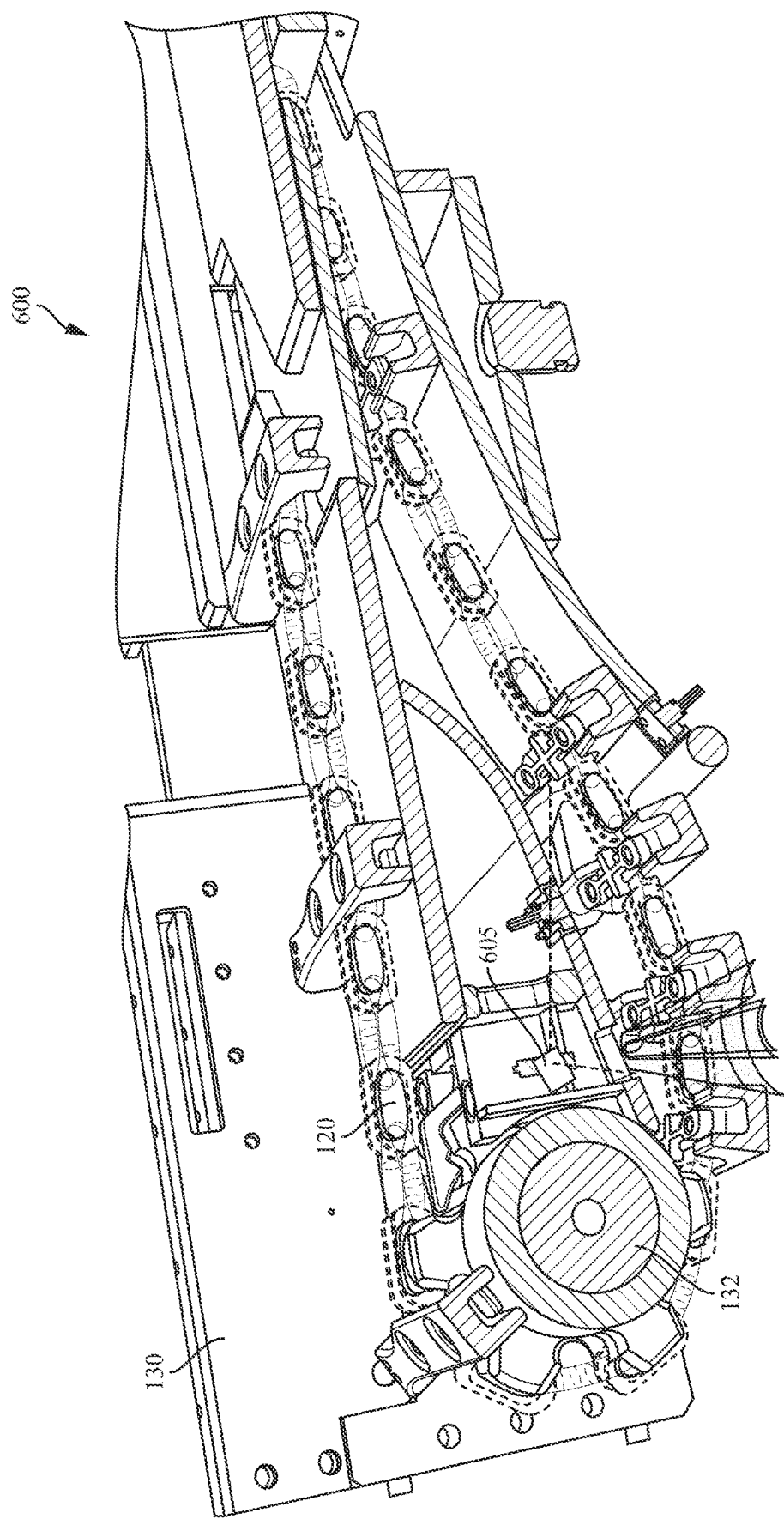
FIG. 11 illustrates a sensor assembly of the control system of FIG. 2, according to an embodiment of the invention.

FIG. 11 illustrates another embodiment 600 of the sensor assembly 205. In the illustrated embodiment 600, the sensor assembly 205 includes a first visual sensor 605. The visual sensor 605 may be, for example, a laser emitter/scanner, a LiDAR (light detection and ranging) sensor, a camera, and the like. Unlike the proximity sensors 415-440, 505, 510, and the analog output sensor 310 described above, the visual sensor 605 captures image data. As shown in the illustrated embodiment, the visual sensor 605 is positioned near the first sprocket 132 and is directed toward the first conveyor chain 120.

Figure 12:
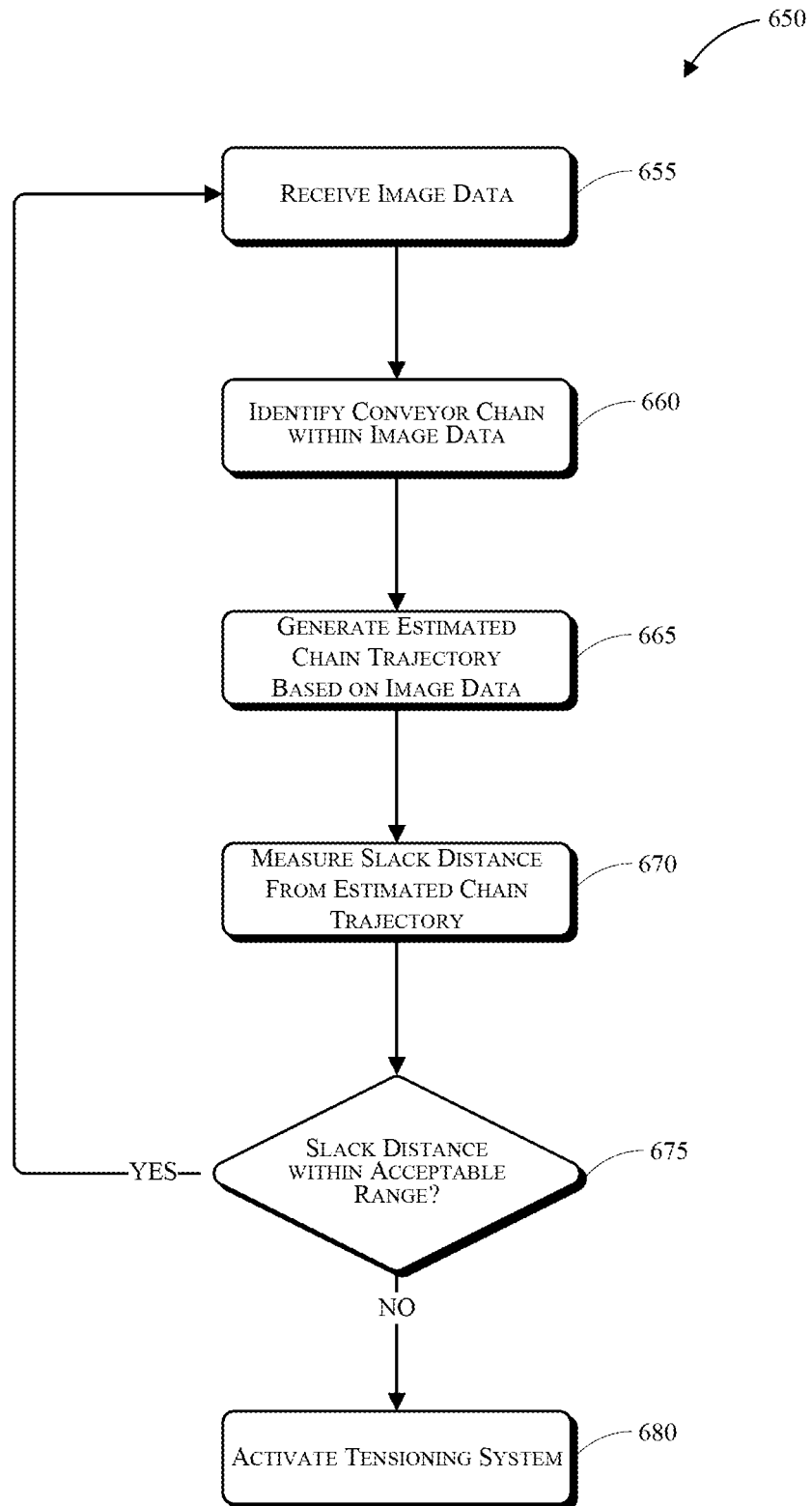
FIG. 12 is a process for maintaining tension in the conveyor system of FIG. 1 using the sensory assembly of FIG. 11.

FIG. 12 is a flowchart illustrating a method 650 of maintaining the conveyor system 100 at an adequate tension using the fourth embodiment 600 of the sensor assembly 205. In STEP 655, the electronic processor 215 receives the image data from the visual sensor 605. The electronic processor 215 then identifies the first conveyor chain 120 in the image data captured by the visual sensor 605 (STEP 660). The electronic processor 215 utilizes several image processing techniques to identify the conveyor chain 120 from the image data captured by the visual sensor 605 such as, for example, shape recognition, straight edge detection, outlier detection, and the like. Based on the image data and the identified conveyor chain 120, the electronic processor 215 then generates an estimated chain trajectory (STEP 665). The estimated chain trajectory may be similar to, for example, those shown in FIGS. 10A-10D. In the illustrated embodiment, the electronic processor 215 proceeds to measure a slack distance from the estimated chain trajectory (STEP 670). In other words, the slack distance is measured from the virtual estimated chain trajectory rather than from the first conveyor chain 120 itself. The electronic processor 215 then determines whether the measured slack distance is within an acceptable range (STEP 675). The acceptable range may be, for example, between 25-120 mm. Therefore, when the slack distance is lower than 25 mm or greater than 120 mm, the electronic processor 215 determines that the slack distance is outside the acceptable range. When the slack distance is within the acceptable range, the electronic processor 215 continues to receive the image data from the visual sensor 605 (STEP 655). Otherwise, when the slack distance is outside the acceptable range, the electronic processor 215 activates the tensioning system (STEP 680), and then continues to receive the image data from the visual sensor 605 (STEP 655).

Figure 13:
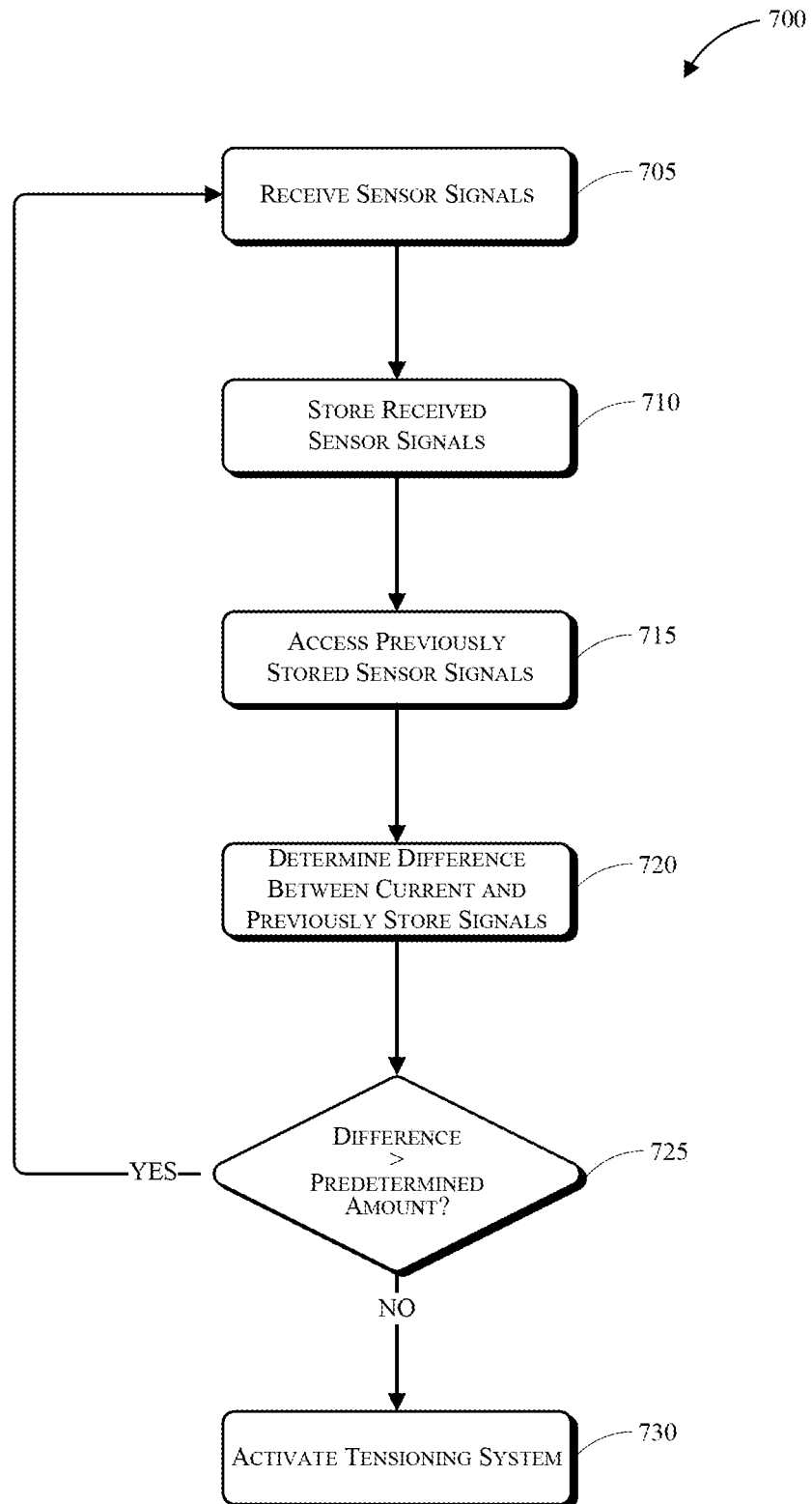
FIG. 13 is a process for analyzing whether the conveyor system of FIG. 1 is approaching an unacceptable tension range.

In some embodiments, the electronic processor 215 stores each measurement regarding the tension of the conveyor 105 in a memory. Based on the stored measurements, the electronic processor 215 may also be able to implement a trend analysis to identify when the conveyor 105 is likely to be outside the acceptable tension range. FIG. 13 is a flowchart illustrating an exemplary method 700 of analyzing previously acquired conveyor tension data to determine whether the conveyor 105 is trending toward being under-tensioned or over-tensioned. As shown in FIG. 13, the electronic processor 215 receives sensor signals from one of the embodiments of the sensor assembly 205 described above (STEP 705). The electronic processor 215 then stores the received sensor signal (STEP 710). When implementing the trend analysis, the electronic processor 215 accesses previously stored sensor signals (STEP 715). The electronic processor 215 then determines a difference between the current sensor signal and the previously stored sensor signal (STEP 720). The electronic processor 215 proceeds to determine whether the difference is greater than a predetermined amount (e.g., indicating that the slack distance has increased by more than, for example, 30 mm) at STEP 725. When the electronic processor determines that the difference is not greater than the predetermined amount, the electronic processor continues to receive the sensor signals as described in STEP 705. On the other hand, when the electronic processor 215 determines that the difference is greater than the predetermined amount, the electronic processor activates the tensioning system 210 to prevent the conveyor 105 to become under-tensioned or over-tensioned (STEP 730).

In one embodiment, the electronic processor 215 accesses sensor signals associated with the previous activations of the tensioning system 210. For example, the electronic processor 215 accesses the sensor signals for the previous five times that the tensioning system 210 was activated. The electronic processor 215 then identifies a pattern associated with the previous signals before the activation of the tensioning system 210. The electronic processor 215 then compares the most recently received sensor signals to the identified pattern. When the most recently received sensor signals match the identified pattern, the electronic processor activates the tensioning system 210 to inhibit the conveyor 105 from becoming under-tensioned or over-tensioned. In some embodiments, the electronic processor 215 accesses previously stored sensor signals and calculates a rate of change of the slack distance. When the rate of change of the slack distance exceeds a predetermined threshold, the electronic processor 215 determines that the conveyor 105 is trending to become over-tensioned or under-tensioned, and activates the tensioning system 210 to inhibit the conveyor 105 from becoming under-tensioned or over-tensioned.

In some embodiments, the electronic processor 215 may activate the tensioning system 210 before the conveyor 105 begins its operation such that the conveyor 105 starts at a predetermined (e.g., calibrated) tension. The electronic processor 215 may then evaluate the tension condition of the conveyor 105 as described above.

Accordingly, this application describes various sensors assemblies that are used to determine a tension of a conveyor element (for example, a conveyor chain). The output signals and data from the sensor assemblies are utilized by the electronic processor to determine when to operate the tensioning system such that the conveyor is maintained within an adequate tension range. Various features and advantages of the invention are set forth in the following claims.

What is claimed is:

1. A conveyor system, comprising:
a sprocket;
a conveyor element coupled to the sprocket to move around the sprocket, the conveyor element including a top-side portion on a top side of the sprocket and a bottom-side portion on an underside of the sprocket;
a sensor positioned adjacent to the sprocket between the top-side portion and the bottom-side portion of the conveyor element, the sensor configured to generate an output signal that varies proportionally to a distance between the sensor and the bottom-side portion of the conveyor element;
a tensioning system; and
an electronic processor coupled to the sensor and to the tensioning system, the electronic processor configured to
receive the output signal from the sensor,
determine a value for slack distance of the conveyor element based on the output signal, and
control the tensioning system based on the value for slack distance.

2. The conveyor system of claim 1, wherein the sensor is an analog distance sensor and a magnitude of the output signal varies proportionally to the distance between the sensor and the bottom-side portion of the conveyor element.

3. The conveyor system of claim 2, wherein the sensor is at least one selected from a group of an ultrasonic sensor, an infrared (IR) sensor, and a magnetometer.

4. The conveyor system of claim 1, wherein, to control the tensioning system based on the value for slack distance, the electronic processor is configured to:
decrease a tension in the conveyor element to prevent an over-tensioned condition when the value for slack distance is below a first threshold, and
increase the tension in the conveyor element to prevent an under-tensioned condition when the value for slack distance is above a second threshold.

5. The conveyor system of claim 1, wherein, to control the tensioning system based on the value for slack distance, the electronic processor is configured to:
 determine a correction amount based on a difference between the value for slack distance and a threshold, where the correction amount is proportional to the difference, and
 control the tensioning system to change a tension of the conveyor element by an amount that is based on the correction amount.

6. The conveyor system of claim 5, wherein, to control the tensioning system to change the tension of the conveyor element by an amount that is based on the correction amount, the electronic processor is configured to:
 set a timer having a duration corresponding to the correction amount, and
 activate the tensioning system for the duration of the timer to change the tension of the conveyor element.

7. The conveyor system of claim 1, further comprising:
 a second sprocket;
 a second conveyor element coupled to the second sprocket to move around the second sprocket, the second conveyor element including a second top-side portion on a top side of the second sprocket and a second bottom-side portion on an underside of the second sprocket;
 a second sensor positioned adjacent to the second sprocket between the second top-side portion and the second bottom-side portion of the second conveyor element, the second sensor configured to generate a second output signal that varies proportionally to a second distance between the second sensor and the second bottom-side portion of the conveyor element; and
 a second tensioning system;
 wherein the electronic processor is coupled to the second sensor and to the second tensioning system, the electronic processor configured to
  receive the second output signal from the second sensor,
  determine a second value for slack distance of the second conveyor element based on the second output signal, and
  control the second tensioning system based on the second value for slack distance.

8. The conveyor system of claim 7, further comprising:
 a plurality of flight bars, each flight bar connected between the conveyor element and the second conveyor element.

9. A method for controlling tension in a conveyor element of a conveyor system that moves around a sprocket, the method comprising:
 generating an output signal by a sensor positioned adjacent to the sprocket and between a top-side portion of the conveyor element on a top side of the sprocket and a bottom-side portion of the conveyor element on a bottom side of the sprocket, wherein the output signal from the sensor varies proportionally to a distance between the sensor and the bottom-side portion of the conveyor element;
 receiving, at an electronic processor, the output signal from the sensor;
 determining, by the electronic processor, a value for slack distance based on the output signal; and
 controlling, by the electronic processor, a tensioning system based on the value for slack distance.

10. The method of claim 9, wherein the sensor is an analog distance sensor and a magnitude of the output signal varies proportionally to the distance between the sensor and the bottom-side portion of the conveyor element.

11. The method of claim 10, wherein the sensor is at least one selected from a group of an ultrasonic sensor, an infrared (IR) sensor, and a magnetometer.

12. The method of claim 9, wherein controlling the tensioning system based on the value for slack distance includes:
 decreasing a tension in the conveyor element to prevent an over-tensioned condition when the value for slack distance is below a first threshold, and
 increasing the tension in the conveyor element to prevent an under-tensioned condition when the value for slack distance is above a second threshold.

13. The method of claim 9, wherein controlling the tensioning system based on the value for slack distance includes:
 determining a correction amount based on a difference between the value for slack distance and a threshold, where the correction amount is proportional to the difference, and
 controlling the tensioning system to change a tension of the conveyor element by an amount that is based on the correction amount.

14. The method of claim 13, wherein controlling the tensioning system to change the tension of the conveyor element by an amount that is based on the correction amount includes:
 setting a timer having a duration corresponding to the correction amount, and
 activating the tensioning system for the duration of the timer to change the tension of the conveyor element.

15. The method of claim 9, wherein the conveyor system further includes a second conveyor element that moves around a second sprocket, the method further comprising:
 generating a second output signal by a second sensor positioned adjacent to the second sprocket and between a second top-side portion of the second conveyor element on a top side of the second sprocket and a second bottom-side portion of the second conveyor element on a bottom side of the second sprocket, wherein the second output signal from the second sensor varies proportionally to a second distance between the second sensor and the second bottom-side portion of the conveyor element;
 receiving, at the electronic processor, the second output signal from the second sensor;
 determining, by the electronic processor, a second value for slack distance based on the second output signal; and
 controlling, by the electronic processor, a second tensioning system based on the second value for slack distance.

16. A controller for controlling tension in a conveyor element of a conveyor system that moves around a sprocket, the controller including a non-transitory computer readable medium and an electronic processor, the controller comprising computer executable instructions stored in the computer readable medium for controlling operation of the conveyor system to:
 receive, at the electronic processor, an output signal from a sensor, wherein the sensor is positioned adjacent to the sprocket and between a top-side portion of the conveyor element on a top side of the sprocket and a bottom-side portion of the conveyor element on a bottom side of the sprocket, wherein the output signal from the sensor varies proportionally to a distance between the sensor and the bottom-side portion of the conveyor element;

determine, by the electronic processor, a value for slack distance based on the output signal; and control, by the electronic processor, a tensioning system based on the value for slack distance.

17. The controller of claim 16, wherein the sensor is an analog distance sensor and a magnitude of the analog output signal varies proportionally to the distance between the sensor and the bottom-side portion of the conveyor element.

18. The controller of claim 16, wherein, to control the tensioning system based on the value for slack distance, the controller further includes computer executable instructions stored in the computer readable medium for controlling operation of the conveyor system to:

decrease a tension in the conveyor element to prevent an over-tensioned condition when the value for slack distance is below a first threshold, and increase the tension in the conveyor element to prevent an under-tensioned condition when the value for slack distance is above a second threshold.

19. The controller of claim 16, wherein, to control the tensioning system based on the value for slack distance, the controller further includes computer executable instructions stored in the computer readable medium for controlling operation of the conveyor system to:

determine a correction amount based on a difference between the value for slack distance and a threshold, where the correction amount is proportional to the difference, and control the tensioning system to change a tension of the conveyor element by an amount that is based on the correction amount.

20. The controller of claim 19, wherein, to control the tensioning system to change the tension of the conveyor element by an amount that is based on the correction amount, the controller further includes computer executable instructions stored in the computer readable medium for controlling operation of the conveyor system to:

set a timer having a duration corresponding to the correction amount, and activate the tensioning system for the duration of the timer to change the tension of the conveyor element.

* * * * *